Oct. 16, 1934.   H. PRICE   1,977,454
AUTOMATIC COOKING APPARATUS
Filed Feb. 15, 1932   2 Sheets-Sheet 1

Inventor.
Harry Price
by Heard Smith & Tennant.
Attys.

Oct. 16, 1934.                     H. PRICE                         1,977,454
                          AUTOMATIC COOKING APPARATUS
                            Filed Feb. 15, 1932          2 Sheets-Sheet 2
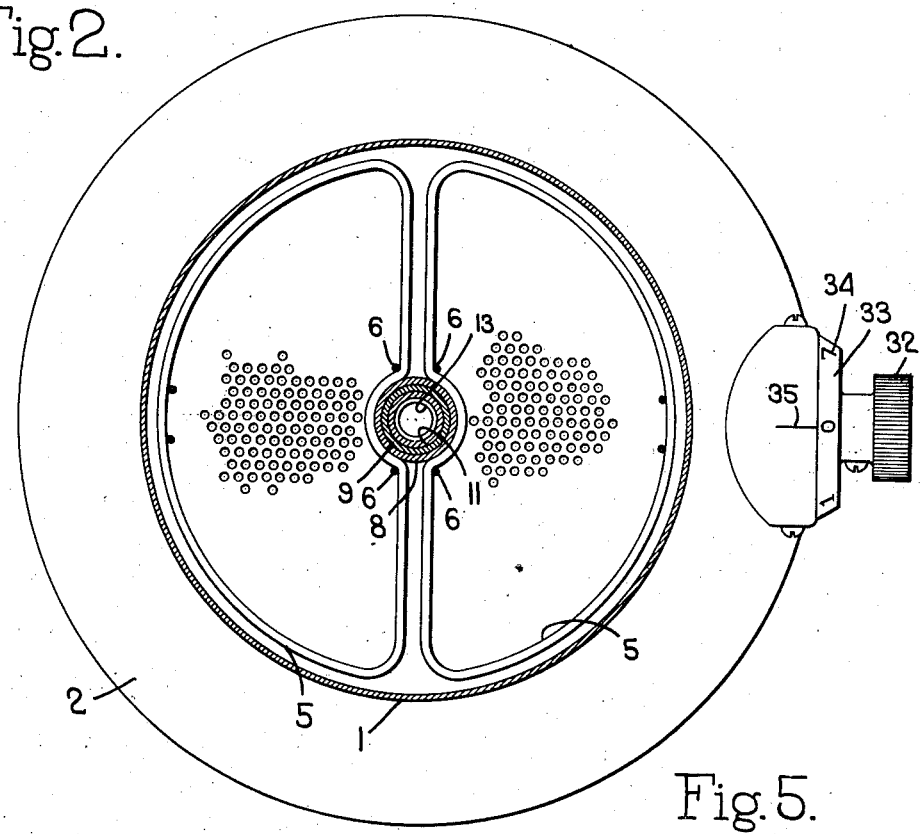
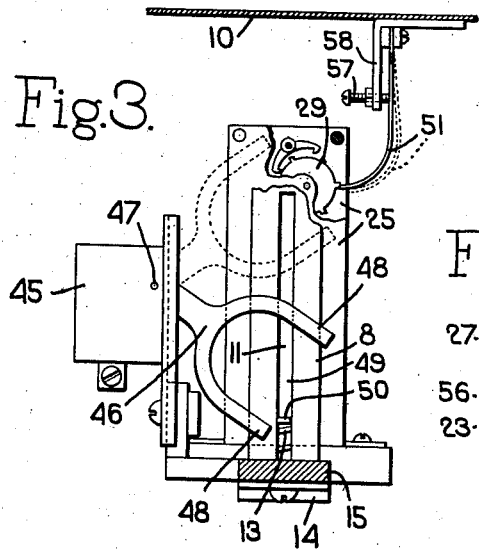
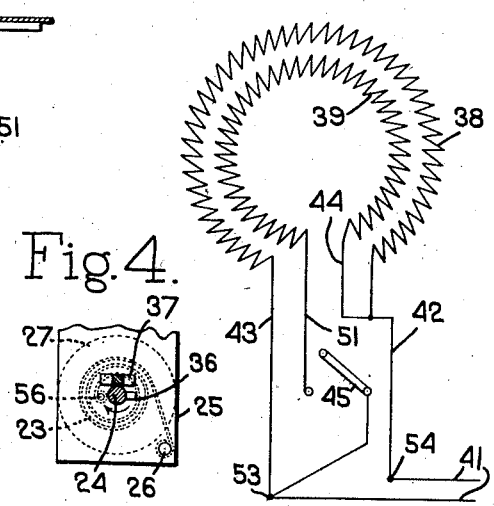
Inventor.
Harry Price
by Heard Smith & Tennant.
Attys.

Patented Oct. 16, 1934

1,977,454

UNITED STATES PATENT OFFICE 1,977,454

AUTOMATIC COOKING APPARATUS

Harry Price, Boston, Mass.

Application February 15, 1932, Serial No. 593,106

4 Claims. (Cl. 161—16)

This invention relates to a cooking apparatus of that type which embodies time mechanism controlling the length of time which the food is subjected to the cooking temperature and one of the objects of the invention is to provide a novel cooker of this type which is so constructed that the time mechanism will not be set in operation until the cooking vessel or cooking compartment has attained a predetermined temperature. With these improvements, therefore, if the food to be cooked is placed in the cooking vessel or cooking compartment when it is at a temperature below the desired cooking temperature and the apparatus is set in operation the time mechanism will be held inoperative until the cooking vessel or cooking chamber has reached the predetermined temperature, at which time the time mechanism will start to measure off the time interval during which the cooking operation is to be continued. At the end of the time interval the food is automatically removed from the cooking compartment thus bringing the cooking operation to an end.

These operations are provided for by employing means for normally locking the time mechanism from operation but which is responsive to an increase in temperature to release the time mechanism when the cooking compartment has reached the predetermined cooking temperature.

Any suitable heating means may be employed for heating the cooking vessel or cooking compartment but I will preferably use an electric heating device for this purpose because of its manifest advantages.

In the construction herein illustrated the heating device comprises a plurality of sources of heat, one of which is adapted to maintain the cooking compartment or cooking vessel at a temperature somewhat below the predetermined critical point and the other of which when in operation augments the first-named source of heat and co-operates therewith to produce a sufficiently high temperature in the cooking compartment or cooking vessel to perform the cooking operation.

In the present embodiment of the invention the second source of heat is normally inoperative but is rendered operative by the act of putting the food or other material into the cooking compartment. The cessation of the operation of said second source of heat, however, is controlled by the time mechanism which, however, does not begin to function until the temperature in the cooking compartment has reached the predetermined cooking temperature.

My improvements may be embodied in a cooking apparatus for cooking a great variety of different foods and for cooking different materials. As one simple and practical illustration of the invention I have shown it as it might be embodied in an egg cooker and will so describe it but it is to be understood that the invention is not at all limited to the cooking of eggs nor to a cooker in which the food is cooked in heated liquid as the invention is equally applicable to ovens and other types of cookers where the cooking operation is more in the nature of baking.

As applied to an electric cooker the heating apparatus may comprise two resistance coils and the apparatus herein shown is constructed so that normally one of the coils will be operative to maintain the water in the cooking vessel at a temperature somewhat below cooking temperature. When the eggs are deposited in the vessel the second or high resistance coil will be thrown into operation thus heating the water to the cooking temperature and when it reaches the cooking temperature the thermostat controlling the time mechanism is released so that the time mechanism then functions to determine the length of time which the cooking will continue. At the end of this time interval the eggs are automatically withdrawn from the cooking vessel and the high resistance coil is cut out of the circuit.

Fig. 2 is a section on the line 2—2, Fig. 1;

Fig. 3 is a fragmentary side view illustrating the switch-actuating mechanism by which the heating coils are controlled and also illustrating the thermostatic control for the time mechanism;

Fig. 4 is a section on the line 4—4, Fig. 1;

Fig. 5 is a wiring diagram;

Figure 1:
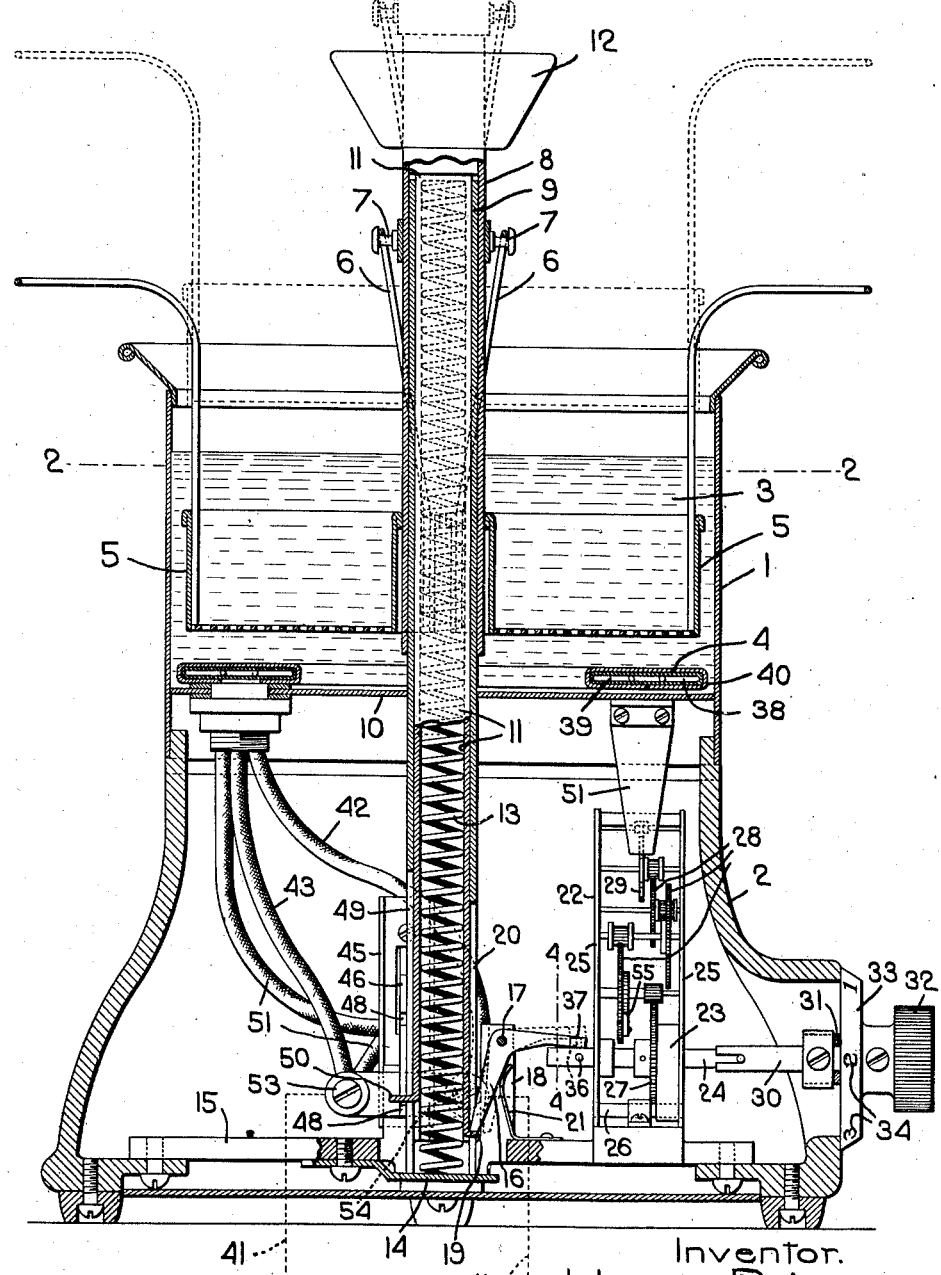
Fig. 1 is a sectional view through an egg boiler embodying my invention.

In the drawings the water-containing vessel in which the eggs are cooked is indicated generally at 1 and this is shown as being mounted on a supporting base 2 which is made hollow for the purpose of receiving the controlling mechanism. The vessel 1 contains water 3 in which the eggs are to be cooked. The water is heated by electric heating means indicated generally at 4. The particular construction of the heating means and the control therefor will be more fully hereinafter described.

The eggs to be cooked are placed in baskets or containers 5, two such containers being herein shown. These baskets are normally held in a position above the level of the water 3 but may be lowered into the water for the purpose of cooking the eggs contained therein.

As herein shown each basket is provided with a supporting bail 6 which is normally hung on a stud or projection 7 extending from a sleeve 8 that telescopes over a hollow post 9 situated centrally of the vessel 1. This post extends through the bottom 10 of the vessel and is rigidly secured thereto and the lower end is secured to a supporting bracket 15 located within the base 2.

Situated within the hollow post 9 is a tubular member 11 which is connected at its upper end to the sleeve 8. As herein shown both the tubular member 11 and the sleeve 8 are secured at their upper ends to a handle 12. Situated within the tubular member 11 is a spring 13 which normally holds the tubular member 11 and sleeve 8 in their elevated positions thus holding the baskets 5 above the water level in the vessel 1. This spring rests at its lower end upon a foot or support 14 secured to the supporting bracket 15. The eggs in the basket 5 can be immersed in the water 3, however, by depressing the handle 12 thereby moving the sleeve 8 and tubular member 11 downwardly relative to the post 9, this movement compressing the spring 13 as will be obvious and placing it under tension. This spring serves to raise the tubular member 11 and sleeve 8 and thereby elevate the egg-containing baskets 5 out of the water at the end of the cooking interval as will be presently described.

Means are provided for automatically locking the tubular member 11 in its lowered position when it has been lowered to submerge the egg containers 5 in the water 3. The means I have herein shown for this purpose comprises a latch member 16 pivoted at 17 to a post 18 rising from the bracket 15, said latch member being adapted to engage a projection 19 extending from the tubular member 11 when the latter is in its lowered position as shown in full lines Fig. 1. This projection operates in a slot 20 formed in the lower end of the post 9. The latch 16 is spring pressed, it being acted on by a spring 21 which normally holds it in its operative position. As the handle 12 is forced downwardly to submerge the eggs in the water 3 the projection 19 will wipe by the latch 16 and the latter will automatically engage the projection thereby locking the parts in the position shown in Fig. 1, in which position the eggs will be submerged in the water 3.

There is provided a time mechanism by which the latch 16 is released from engagement with the projection 19 after the eggs have been cooking for a predetermined time and the time mechanism in turn is controlled by a thermostatic device which retains the time mechanism inoperative until the water 3 reaches a predetermined temperature. As a result the start of the time interval during which the eggs are cooking is determined by the temperature of the water 3 rather than by the operation of submerging the eggs in the water.

The time mechanism is indicated generally at 22. It comprises a spiral spring 23, the inner end of which is anchored to a gear 27 fast on a shaft 24 journalled in the framework 25 that supports the time mechanism, and the outer end of which is anchored at 26 to said framework. The gear 27 is connected through a train of gearing 28 to an escapement 29 of usual construction, said train of gearing having thereon a one-way driving connection 55, such as a pawl and ratchet, which allows the spring to be wound up without operating the escapement but causes the escapement to operate whenever the spring is unwound. When the spring is wound up, it will tend to uncoil or unwind and in doing so will rotate the shaft 24, the speed of rotation, of course, being determined by the escapement 29. The shaft 24 is coupled to a shaft section 30 which is journalled in bearings 31 carried by the base 2 and said shaft section 30 carries at its outer end a knob 32 by which the spring may be wound up, said knob being situated outside of the base 2. Associated with the knob is an indicating disk 33 bearing indications 34 in the form of numerals "0", "1", "2", "3", etc. These numerals co-operate with an indication mark 35 formed on the base 1 to assist in properly setting the time mechanism. When the spring is unwound, the "0" indication will be aligned with the index mark 35 as shown in Fig. 2.

The shaft 24 carries at its inner end a projection 36 which is designed to co-operate with the tail 37 of the latch 16 in order to release the latter. The construction of the time mechanism is such that if, for instance, the spring is partially wound up by turning the knob 32 and indicating disk 33 from the zero position to a position where any one of the indicating marks 34 are aligned with the index mark 35 it will take a number of units of time corresponding to such indicating mark to unwind the spring and thus restore the shaft 24 to its zero position. In other words, if the knob 32 is turned from the zero position shown in Fig. 2 into a position so that the "3" indicating mark comes opposite the index mark 35 and the time mechanism is then released, it will take three units of time for the spring to unwind and return the parts to the zero position. Where eggs are being cooked the unit of time will naturally be minutes as this is the unit of time by which the cooking of eggs is usually measured.

The projection 36 is so positioned on the shaft 24 that when during the unwinding of the spring the shaft 24 is brought into a position to correspond to the zero position of the indicator, the projection 36 will at such time be brought into engagement with the tail 37 of the latch thereby lifting said tail and releasing the latch from engagement with the projection 19. When this is done, the spring 13 will function to elevate the egg containers 5 and raise them out of the water 3. Hence in cooking the eggs the indicator disk 33 is set to indicate the number of minutes which it is desired that the eggs should be cooked and at the termination of such time the eggs will be automatically raised from the cooking vessel.

As stated above one feature of my invention relates to a construction wherein the time mechanism will be held inoperative whenever the temperature of the cooking vessel or cooking chamber is below a predetermined temperature but will be released and thus permitted to operate whenever the temperature of said chamber is increased to reach said predetermined temperature. The means for accomplishing this will be presently described.

The means herein shown for heating the cooking vessel comprises two heating coils 38 and 39, both of which are enclosed in a suitable casing 40. The coil 38 is a low wattage coil and the coil 39 is a high wattage coil. The low wattage coil 38 will be permanently connected in the circuit 41 by which the current is supplied to the coils so that whenever the egg cooker is connected to a supply circuit the low wattage coil 38 will be in operation. It is intended that this low wattage coil shall function to maintain the cooking vessel at a temperature which is somewhat below the critical or predetermined cooking temperature.

The high wattage coil 39 is in a normally open circuit which is automatically closed when the food to be cooked is placed in the cooking chamber or cooking vessel, and in the construction herein shown the circuit of this coil 39 is automatically closed when the egg container 5 is lowered into the water or liquid 3.

Fig. 5 shows a wiring diagram.

One side of the circuit 41 leads to a binding post 54 and is connected to one end of the low wattage coil 38 through a circuit connection 42 and the other side of said circuit 41 leads to a binding post 53 and is connected to the other end of said low wattage coil through another circuit connection 43. One end of the high wattage coil 39 is connected by a circuit 44 to a circuit connection 43 and the other end is connected by a circuit connection 51 to the binding post 53, said circuit connection having a switch 45 therein by which said high wattage coil 39 can be connected in the circuit.

As stated above this switch 45 is normally open and means are provided for closing it when the egg containers are lowered into the water. The switch 45 may be of any suitable construction and, as shown, it comprises suitable contacts enclosed in a switch box. The switch is actuated by a swinging switch actuator 46 which is pivoted to the switch box at 47. This actuator has a forked end presenting the two arms 48 which lie alongside of the lower end of the post 8. This end of the post is slotted at 49 and the lower end of the tubular member 11 is provided with a laterally projecting finger 50 which operates in the slot.

When the swinging switch actuator 46 is in the dotted line position Fig. 3, the switch will be open, which is the position of the parts when the egg carrier is in its elevated position. At this time the finger 50 will be at the upper end of the slot 49, the engagement of the finger with the upper end of the slot serving to limit the spring-impelled movement of the tubular member. When the handle 12 is depressed to lower the egg carriers from the dotted to the full line position Fig. 1 by which said carriers are lowered into the water, said finger 50, will during its downward movement, engage the lower arm 48 and swing the switch-actuating lever from the dotted to the full line position thereby closing the switch 45 and throwing the high wattage coil 39 into the circuit. The water is then subjected to the heat produced by both coils and will be rapidly heated to the desired cooking temperature. When the eggs are cooked and the latch 16 has been released by the time mechanism, the upward movement of the tubular member 11 will cause the finger 50 to engage the upper arm 48 thereby swinging the switch-actuating levers from the full to the dotted line position and opening the switch 45.

In the device herein illustrated the starting of the operation of the time mechanism is thermostatically controlled. To accomplish this I have provided a thermostatic locking element 51 which normally has locking engagement with the escapement 29 thereby holding the time mechanism from operation as shown in full lines Fig. 3. As this thermostatic element is heated it tends to swing backwardly into the dotted line position Fig. 3. Said element is so constructed that it will maintain its locking engagement with the escapement 29 until the water 3 is at a predetermined temperature, which may be any desired temperature. At such time the thermostatic element will be moved back into the dotted line position thereby to release the escapement and allow the time mechanism to operate.

As stated above it is intended that the heating coils 38 will keep the water at approximately the predetermined temperature at which the thermostat 51 will assume its inoperative position but if the water is below this critical or predetermined temperature said thermostat will be maintained in a position to lock the time mechanism from movement. Hence if at such time the eggs are put into the container and the latter lowered into the water and the spring wound up and the time mechanism set for the desired predetermined time interval during which eggs are to be cooked, the time mechanism will remain inoperative until the temperature of the water reaches a predetermined point, at which time the thermostatic device will release the escapement thus permitting the time mechanism to start operating. The initiation or start of the time interval during which the eggs are to be cooked is, therefore, controlled by the thermostatic device and with my invention such time interval will not begin until the water 3 is at the desired cooking temperature. This ensures uniform even cooking of eggs under all circumstances.

With my improvements, therefore, it is not necessary to wait until the water reaches a predetermined temperature before placing the eggs in the water. In fact, it is not necessary to take the temperature of the water 3 into account at all. Whenever any eggs are to be cooked all that is necessary is to place the eggs in the containers 5 and depress the handle 12 thereby submerging the eggs and set the time mechanism for the proper interval of time by adjusting the knob 32. This will subject the water to the maximum heat of the heating unit and when the water has been heated to the critical temperature the time mechanism will automatically start and at the end of the time mechanism the eggs will be automatically raised out of the water 3.

Means are herein shown for adjusting the thermostat so that it will function at different temperatures. The thermostat element 51 is carried by a bracket 58 which in turn has an adjusting screw 57 screw threaded thereto, said screw engaging the thermostat. The purpose of this screw is to provide for making an adjustment by which the thermostat may be released for different predetermined temperatures.

While I have illustrated and described above an embodiment of my invention which is specially designed for cooking eggs, yet as stated my invention is not limited in its use to the cooking of eggs nor to a cooker in which the cooking is done by submerging the food to be cooked in a liquid since the features of the invention are equally applicable to cookers of the oven type where the cooking is more in the nature of baking.

I claim.

1. A cooking device comprising a cooking vessel containing water, means to heat the water, a food container having a tubular stem depending therefrom and extending through the bottom of the vessel, a spring situated within said tubular stem and tending normally to raise the container, a latch co-operating with said stem to hold the container in lowered position against the action of the spring, and time mechanism to release the latch.

2. A cooking device comprising a cooking vessel containing water, a tubular guiding post extending through the bottom of said vessel and projecting both above and below said bottom, a vertically-movable container for food to be cooked guided by the upper portion of said guiding post, said container having a tubular stem extending through said guiding post, a spring within the tubular stem tending normally to raise the container, a latch co-operating with said stem to hold the retainer in lowered position, and means to release the latch.

3. An egg cooker having a cooking vessel containing water, means to heat the water, a vertically-movable egg container having a stem depending therefrom and extending through the bottom of the vessel, a spring tending normally to raise the container, a latch co-operating with said stem to retain the container in its lowered position within the vessel, time mechanism to release the latch, and a thermostatic locking element normally locking the time mechanism from operation but responsive to increasing temperature of the water in the cooking vessel to release the time mechanism when said water reaches a predetermined temperature.

4. An egg cooker having a cooking vessel containing water, means to heat the water, a vertically-movable egg container having a stem depending therefrom and extending through the bottom of the vessel, a spring tending normally to raise the container, a latch co-operating with said stem to retain the container in its lowered position within the vessel, and time mechanism including an escapement to release the latch, a thermostatic locking pawl normally engaging said escapement and locking the time mechanism from operation, said pawl being of thermostatic material and being influenced by increasing temperature in the water of the cooking vessel to release the time escapement when the water reaches a predetermined temperature.

HARRY PRICE.